United States Patent [19]

Handy

[11] Patent Number: 4,623,928
[45] Date of Patent: Nov. 18, 1986

[54] HIGH DYNAMIC RANGE CCD DETECTOR/IMAGER

[75] Inventor: Roland J. Handy, Northridge, Calif.

[73] Assignee: Xerox Corporation, Stamford, Conn.

[21] Appl. No.: 674,371

[22] Filed: Nov. 23, 1984

[51] Int. Cl.[4] .............................................. H04N 5/30
[52] U.S. Cl. ................................................. 358/213
[58] Field of Search ..................... 358/213; 250/578; 357/24 LR

[56] References Cited

U.S. PATENT DOCUMENTS

| | | | |
|---|---|---|---|
| 3,866,067 | 2/1975 | Amelio | 357/24 LR |
| 3,995,302 | 11/1976 | Amelio | 358/213 |
| 4,081,841 | 3/1978 | Ochi et al. | 358/213 |
| 4,194,213 | 3/1980 | Kano et al. | 357/24 LR |
| 4,245,283 | 1/1981 | Lohstroh | 357/24 LR |
| 4,348,690 | 9/1982 | Jastrzebski | 358/44 |
| 4,389,661 | 6/1983 | Yamada | 357/24 LR |

Primary Examiner—Gene Z. Rubinson
Assistant Examiner—Stephen Brinich
Attorney, Agent, or Firm—Franklyn C. Weiss

[57] ABSTRACT

A unique charge coupled device imager is utilized to provide high density, large dynamic range recording, with fast response time by injecting the photoelectric detected charge directly from the photosite area to the output shift register. In essence, therefore, the area beneath the photosite used for storage of the injected charge is, in fact, the output shift register, in real time.

3 Claims, 3 Drawing Figures

HIGH DYNAMIC RANGE CCD DETECTOR/IMAGER

This invention relates to a high dynamic range CCD detector/imager which permits high dynamic range, high speed and high density recording with real time transfer of the charge into the output shift register.

BACKGROUND OF THE INVENTION

Charge coupled devices have been used in the past for photoelectric or photogenerated image detectors for use in scanning devices such as for facsimile apparatus, printers, and television systems. Increased density and faster response times are always of interest to a designer utilizing a state of the art charge coupled device. The response times of state of the art charge coupled devices (CCD's) have essentially reached a plateau and further improvements did not appear to be forthcoming in any quantum movement.

According to the present invention, a unique charge coupled device imager is utilized to provide high density, large dynamic range recording, with fast response time by injecting the photoelectric detected charge directly from the photosite area to the output shift register. In essence, therefore, the area beneath the photosite used for storage of the injected charge in prior art CCD imaging detection systems is, in fact, the output shift register, in real time.

DESCRIPTION OF THE DRAWINGS

For a more complete understanding of the invention, reference may be had to the following detailed description of the invention in conjunction with the drawings wherein.

DETAILED DESCRIPTION OF THE INVENTION

Figure 1:
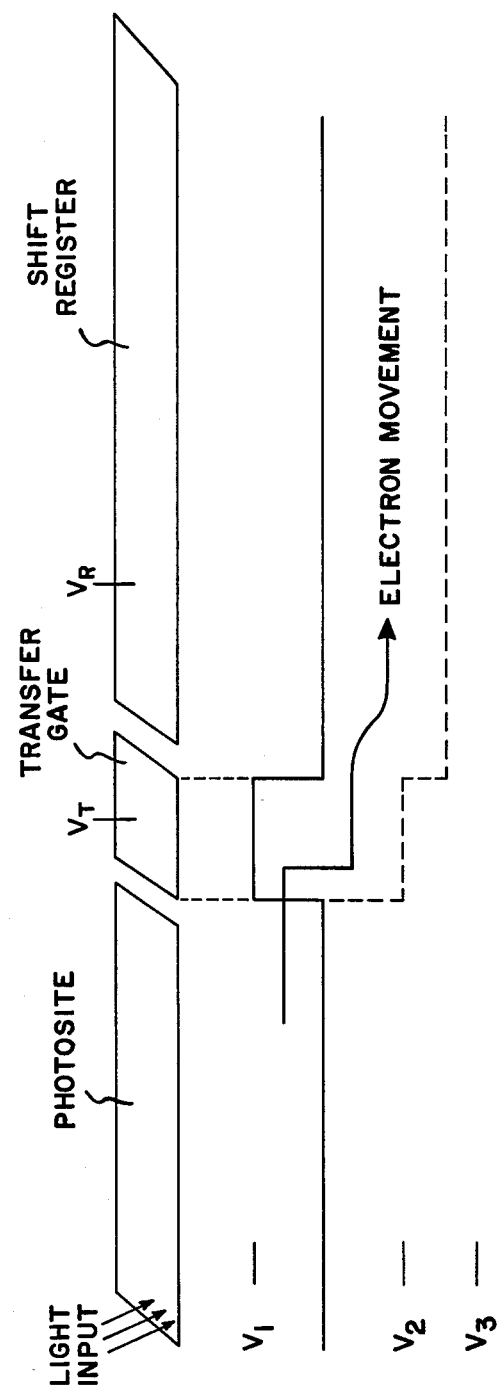
FIG. 1 is a schematic representation of a charge coupled device of the type utilized in the prior art.

FIG. 1 is a side view schematic representation of a conventional charge coupled device imager/detector wherein the photosite areas would be into the paper in a horizontal direction. In operation, then, the voltage VT would be of such value, v1, in order to isolate the electrons injected in response to an amount of light received at the photosite. When the well below the photosite fills to the level determined by the clock frequency of the system, VT would change value in the other direction (V2) and the amount of electrons stored in the well below the photosite would then be transferred via transfer gate to the shift register where a voltage VR, now at voltage level V3, would attract the electrons from the photosite through the transfer gate into the shift register. Then the voltage VT would shift to voltage level V1, isolating the shift register from the photosite and at a predetermined clock rate, and charge received under the shift register would be shifted out into or out of the paper for subsequent use and storage away from the charge coupled device imager/detector. Any number of photosites and transfer gate and shift register combinations can be utilized with typical examples in the prior art of anywhere from 1700 to 6000 photosites on a typical integrated circuit.

Figure 2:
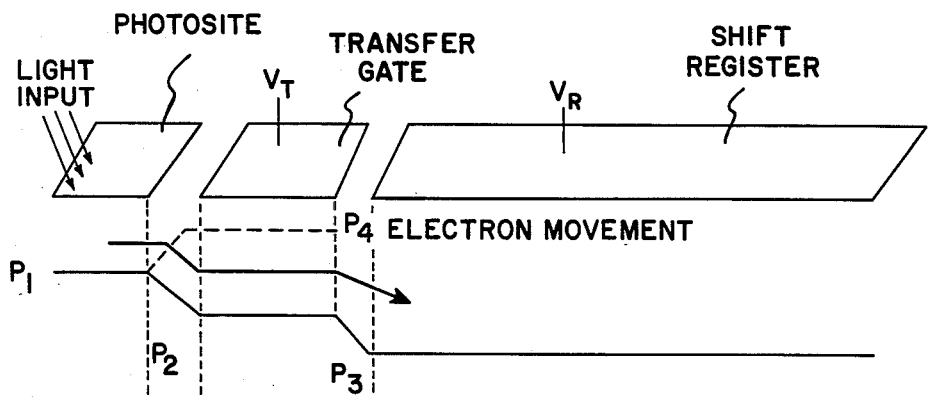
FIG. 2 is a schematic representation of a charge coupled device utilizing and incorporating the principles of the present invention.

FIG. 2 of this application shows the principles of the present invention in accordance with Applicant's invention. In this particular case, the voltage under the transfer gate would be kept at a lower voltage value than that appearing under the photosite so that when the charge electrons are injected into the well beneath the photosite on the integrated circuit substrate, the electrons generated therein are immediately transferred from the photosite area through the transfer gate area into the shift register area wherein voltage P3 exists when a voltage is applied at terminal VR. Thus, in real time the electrons are stored in the shift register as they are generated at the photosite well in response to the amount of light applied to the photosite. Because of the continual storage and transfer of the electrons into the shift register, the photosite area shown in FIG. 3 can be very small in comparison with the photosite area for the prior art device shown in FIG. 1. That is because the electrons are immediately transferred to the shift register and thus the continual generation of electrons beneath the photosite area is never filled but immediately transferred to the shift register which begins to fill in accordance with the amount of light applied to the photosite areas. When the transfer gate voltage vT is subsequently raised to the voltage level P4 to cease the amount of electrons transferred from the photosite area to the shift register, the amount of stored electrons at the shift register areas can be immediately shifted up or down in relation to the surface of the paper comprising FIG. 2, allowing for high speed operation. Such an arrangement as shown in FIG. 2 allows for very high density, high resolution image detection. That is because the photosite area shown in FIG. 2 can be small in relation to the shift registers in FIG. 2 and, for that matter, in relation to the prior art photosites shown typically in FIG. 1.

Figure 3:
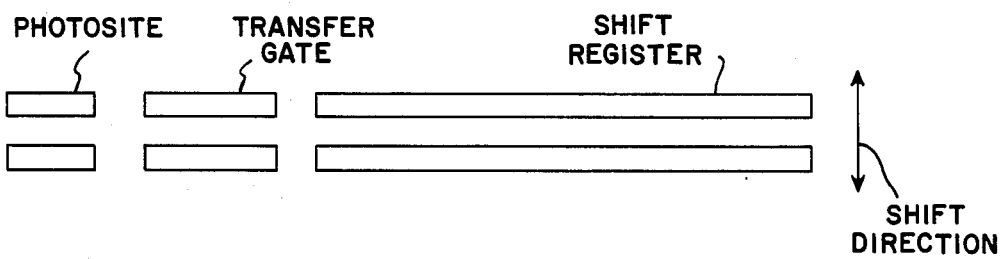
FIG. 3 is a top view of two photosites, two transfer gates and two shift registers of an imager/detector described in conjunction with FIG. 2.

In other words, the photosite areas in FIGS. 2 or 3 do not have to be large in comparison to the prior art devices because the well beneath the photosite area contains the electrons generated in response to the light input, but are immediately transferred to the shift register for intermediate storage there. The speed of the invention is greatly enhanced because immediately upon isolation of the shift register from the light input by changing the voltage to level P4 on the transfer gate, the electrons denoting or depicting the amount of charge in response to the input light on the photosite, is already at the shift register and does not have to be shifted there as would be the case for a typical prior art CCD device shown in FIG. 1. Further, the speed of the device is enhanced because the storage area at the shift register can be long but very narrow (see FIG. 3) and thus the dimension of movement from one shift register to the other is the narrow direction, denoting a fast transfer, while the amount of charge can be large because of the length of the shift register. This device also has the property of high dynamic range because of the real time application of the light input to the photosite and its concomitant transfer of electrons in real time from the photosite area through the transfer gate, to the shift register. The device also has a very fast response time because the voltage on the transfer gate VT can be shifted from voltage level P2 to voltage level P4 very quickly, thus isolating the photosite area from the shift register thereby allowing the quick movement of the electrons stored in the shift register out to other areas for signal enhancement or modification. While this shifting process is proceeding, a similar transfer gate and shift register arrangement can be provided on the other side of the photosite area to allow for a bilinear array or, quadrilinear or other type shift register apparatus depending on the type of device, speed of operation, etc., that is desired.

With present day integrated circuit fabrication techniques, a one micron by one micron photosite area is within the realm of possibility, and still provide the improved aspects of the present invention due to the real time aspect of electron transfer from the photosite area to the shift register. Of course, the smaller the photosite area and accompanying narrow dimensions of the transfer gate and accompanying shift register, the resolution of the device is also vastly improved over prior art apparatuses.

Because of the dual transfer time function of prior art devices shown in FIG. 1, that is, the first stage of transfer of electrons from the photosite to the shift register, and then the second stage movement of the shift register storage out to accompanying storage, such a device would operate in the microsecond range. However, because of the immediate storage of the electrons under the shift register immediately upon injection in the photosite area, there is only a need for a single stage timing of transfer of charge out to subsequent circuitry, and thus it is within the range of the present application to operate in the pico-second range.

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. In a charge coupled device detector/imager including a plurality of photosite areas, associated transfer gates, and associated shift register storage areas, the method of charge detection comprising:
    selectively illuminating said photosite areas with light illumination to be detected,
    simultaneously applying a first voltage potential to said transfer gates so that light induced electron charge is immediately drained away from said photosite area, and
    simultaneously applying a second voltage potential to said shift register storage areas to receive the induced electron charge generated at said photosite areas and immediately drained away therefrom.

2. A charge coupled device detector imager including a plurality of photosite areas, associated transfer gates, and associated shift register storage areas, the improvement comprising:
    first means for applying a first voltage on said transfer gates to simultaneously attract away from the photosite areas any induced electron charges in response to light illuminating said photosite areas,
    second means for applying a second voltage on said shift register areas to attract away from the transfer gates any induced electron charges received at the transfer gates, said induced electrons being transferred from said photosite areas to said shift register areas in real time.

3. The imager as set forth in claim 2, wherein said photosite areas, associated transfer gates, and associated shift register storage areas are substantially rectangular in shape, positioned in line with one another, and their long directions being several times the short dimensions, such that transfer out in the direction parallel to the short dimension of the stored charge in said associated shift register storage areas is a small fraction of the time it takes for the charge to fill the area.

* * * * *